Figure 1:
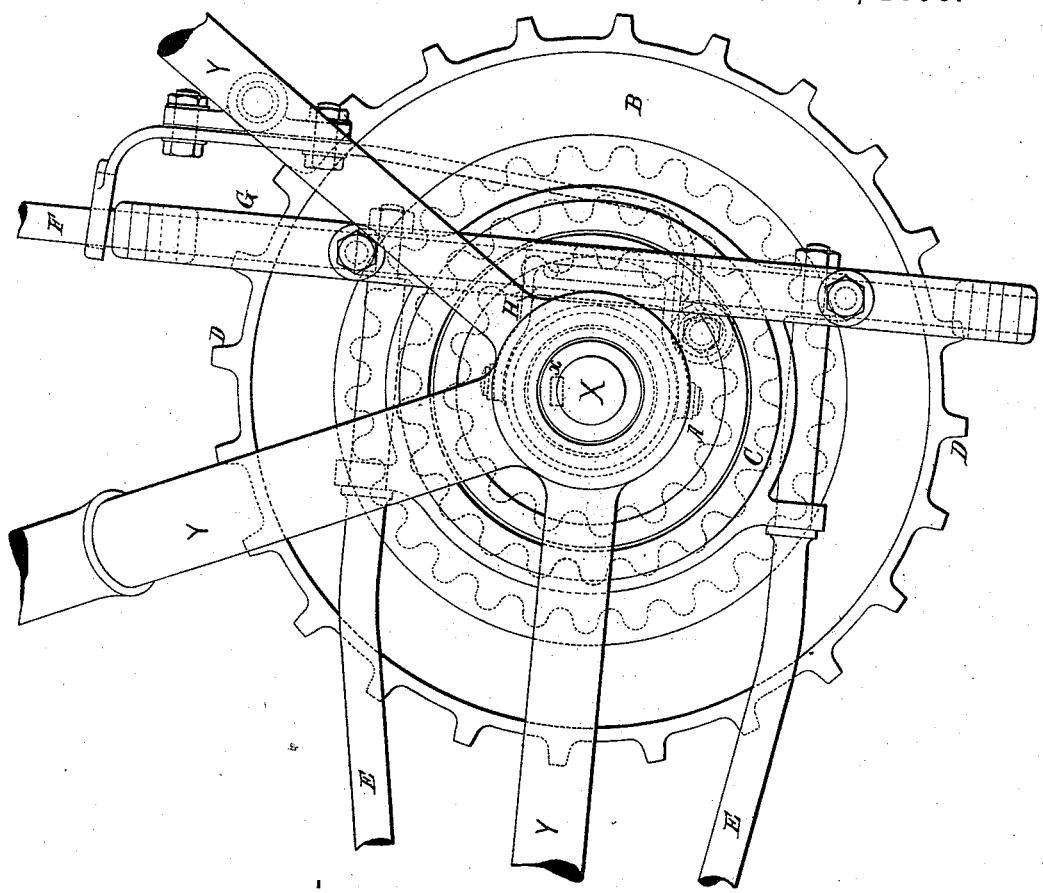

(No Model.) 2 Sheets—Sheet 1.

F. BOWER.
MULTIPLE SPEED GEARING FOR VELOCIPEDES.

No. 532,305. Patented Jan. 8, 1895.

WITNESSES:
George Baumann
S. C. Connor

INVENTOR
Frank Bower
BY
Howson and Howson
his ATTORNEYS.

(No Model.) 2 Sheets—Sheet 2.

F. BOWER.
MULTIPLE SPEED GEARING FOR VELOCIPEDES.

No. 532,305. Patented Jan. 8, 1895.

WITNESSES:
George Baumann
J. C. Connor

INVENTOR
Frank Bower
BY
Howson and Howson
his ATTORNEYS.

UNITED STATES PATENT OFFICE.

FRANK BOWER, OF LONDON, ENGLAND.

MULTIPLE SPEED-GEARING FOR VELOCIPEDES.

SPECIFICATION forming part of Letters Patent No. 532,305, dated January 8, 1895.

Application filed March 3, 1894. Serial No. 502,249. (No model.) Patented in England June 20, 1890, No. 9,597.

*To all whom it may concern:*

Be it known that I, FRANK BOWER, a subject of the Queen of Great Britain and Ireland and Empress of India, and a resident of Stockwell, London, Surrey county, England, have invented Improvements in Multiple Speed-Gearing for Velocipedes, &c., (for which I have obtained British Letters Patent No. 9,597, dated June 20, 1890,) of which the following is a specification.

My invention relates to an improved multiple speed gear, and it has for its object, affording a means of varying the speed of rotation of a driven object as greater or less speed or greater or less power is required.

I carry out my invention as applied to velocipedes in the following manner: On the pedal-crank axle I mount a small spur pinion adapted to slide laterally on a feather way, or its equivalent, on the said axle. Encircling the pedal-crank axle is a compound internal-toothed spur wheel having two, three or more rings of teeth, according to the number of variations required. This compound wheel has no arms or central boss but is mounted on a large ball bearing having an open center for a purpose that will presently be made apparent. This ball bearing is connected with any convenient part of the framework of the machine either by means of a parallel link motion, or a slide, or other equivalent parallel motion, in such a manner that the bearing can be moved in a plane at right angles to the pedal-crank axle to make the said bearing eccentric with the pedal-crank axle and thus by the combined operation of this motion and the lateral motion of the spur wheel as hereinbefore described, bring the compound internal spur wheel into gear with the spur pinion on the pedal-crank axle. On the exterior of the compound internal spur wheel is formed, or fixed, a chain wheel by which motion is communicated to the driving wheel or wheels of the velocipede through a chain in the usual manner. The rings of internal teeth in the compound spur wheel are arranged cone fashion, decreasing in diameter from the outer ring. The inner ring of teeth has exactly the same number of teeth as the spur pinion on the pedal-crank axle, so that when they are engaged, the whole rotate together at one speed. When the spur pinion on the pedal-crank axle gears with either of the other rings of teeth in the compound internal spur wheel, the speed of rotation of the said wheel—carrying the chain wheel—becomes inferior to that of the pedal-crank axle.

It will be understood that two motions are necessary to alter this gear, one to move the bearing carrying the compound internal spur wheel in a plane at right angles to the pedal-crank axle, and the other to slide the spur pinion on the pedal-crank axle laterally to bring it opposite to the ring of teeth in the compound internal spur wheel with which it is desired to gear it. To effect these movements the bearing carrying the compound internal spur wheel is supported by a spindle capable of receiving a vertical movement, thus adapting it to be raised or lowered to the desired amount necessary to give it the requisite eccentricity to permit the compound internal spur wheel to gear with the spur pinion on the pedal-crank axle, the spindle being held in the position required for each change of gear by any suitable locking device. This spindle is also capable of a rotary movement and it carries a clutch lever adapted to operate the spur pinion on the pedal-crank axle and move it laterally on the axle.

In order that my invention may be fully understood I will more particulary describe it making reference to the accompanying drawings which show my multiple speed gear as adapted and arranged for use on a velocipede, to which purpose it is specially adapted.

Figure 4:
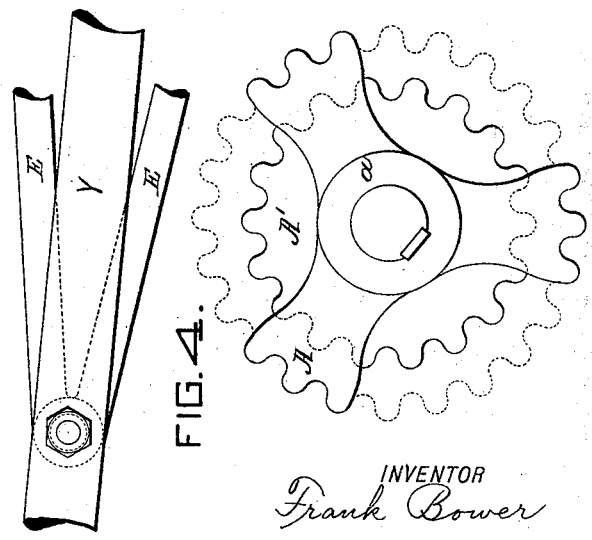
Figure 2:
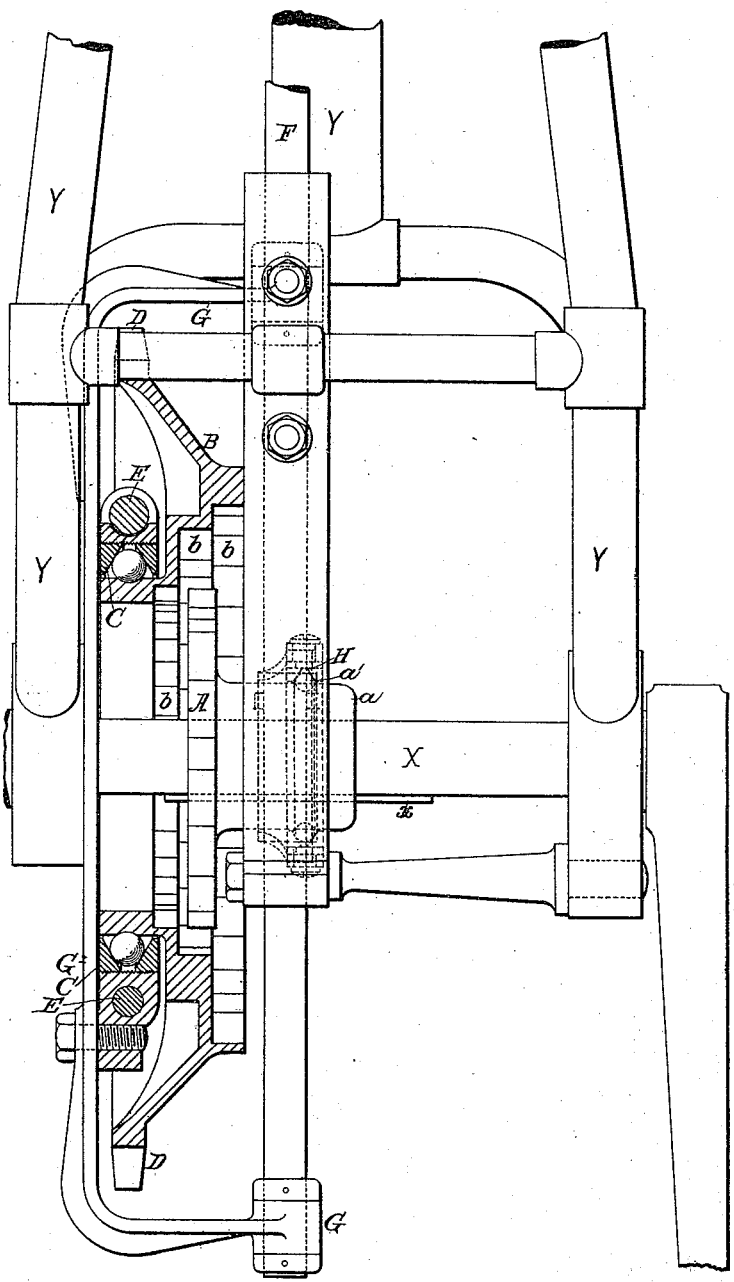
Figure 3:
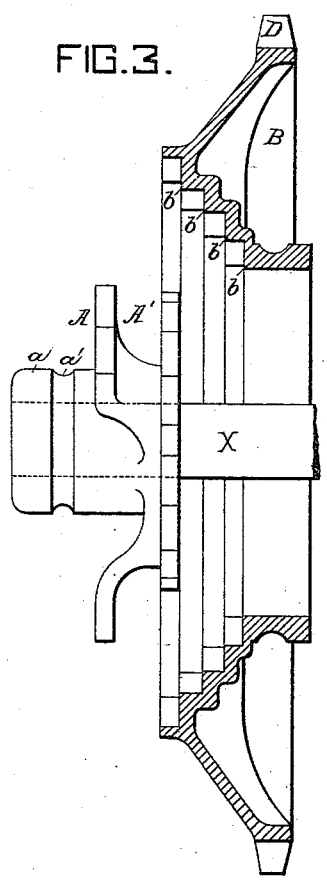

In the drawings, Figure 1 is a broken view in side elevation of the gear as fitted to the pedal-crank axle of a velocipede. Fig. 2 is a broken view in front elevation—partly in section—thereof, and Figs. 3 and 4 are views showing a modification in the construction of the gear.

Throughout the views similar parts are marked with like letters of reference.

On the pedal-crank axle X is mounted a spur pinion A, capable of a lateral movement on the said pedal-crank axle by means of the key or feather x or its equivalent. Encircling the pedal-crank axle X is a compound internal spur wheel B having two, three or more rings b of teeth, according to the variation of speed or power required. This compound internal spur wheel is not mounted on the axle X but is mounted in a large bearing C preferably of the ball type as shown in the accompanying drawings. On the exterior of this compound internal spur wheel B is formed, or fixed, a ring of teeth D forming the driving chain by which motion is communicated to the driving wheel, or wheels, by a chain in the usual and well known manner. The bearing C is carried by a suitable arm E fulcrumed on the frame Y of the machine as near to the axle of the driving wheel or wheels as possible, so that the vertical movement of the compound internal spur wheel carrying the chain does not materially vary the tension of the driving chain.

The position of the bearing C carrying the compound internal spur wheel B is controlled and defined by a spindle F connected to a bracket G mounted on the case of the bearing C in such a manner that although it has a free radial movement in the said bracket it has no free longitudinal movement in respect thereto. Consequently by varying the vertical position of the said spindle F the position of the compound internal spur wheel is varied with respect to the pedal-crank axle X.

To move the spur pinion laterally on the pedal-crank axle X, a clutch lever H is mounted on the spindle F in such a manner that it is constrained to move radially but not longitudinally therewith, so that it is influenced by the radial movement of the spindle but not by its longitudinal movement. The other end of the clutch lever H is connected by a pin and slot or other suitable connection to a ball bearing a' encircling the boss a of the spur pinion A. It will thus be seen that the vertical position of the compound internal spur wheel B with respect to the spur pinion A is controlled by the longitudinal or vertical movement of the spindle F through the bracket G, and that the lateral movement of the spur pinion A on the axle X, and with respect to the compound internal spur wheel B, is controlled by the radial movement of the same spindle F through the clutch lever H.

The spindle F is operated from any suitable and convenient part of the machine and is held in the desired position both longitudinally and radially by any convenient form of catch or locking device.

The gear illustrated by Figs. 1 and 2 of the accompanying drawings gives three variations of speed, the number of teeth in the several rings of the compound internal spur wheel being sixteen, twenty-two, and thirty respectively. The number of teeth in the spur pinion is sixteen, so that when it gears with the smallest ring of teeth in the compound internal spur wheel, it interlocks therewith and the whole mechanism revolves together and the speed of rotation of the driving chain wheel is equal to that of the pedal-crank axle.

If more than three variations of speed are required I prefer to use the arrangement illustrated by Figs. 3 and 4 of the accompanying drawings. In this arrangement the spur pinion A has a second ring of teeth A', the number of teeth being less than that in the smallest ring of teeth in the compound internal spur wheel. This second ring of teeth A' then becomes the main driving spur pinion, and the other ring of teeth A which may if desired be made segmental, as shown by Fig. 4 of the accompanying drawings, becomes the interlocking pinion. By making the ring of teeth A complete, as shown in dotted lines in the aforesaid figure, and properly proportioning the distance between the two rings of teeth A and A' on the spur pinion, a further variation of speed may be obtained as it allows the said ring of teeth A to be brought into gear with the compound internal spur wheel after the ring of teeth A' has passed beyond the smallest ring of teeth therein.

Although my invention has been hereinbefore described as applied to cycles, I wish it to be particularly understood that it is also applicable to all other purposes where a variation of speed or power is required.

I claim as my invention—

1. In a multiple speed gear more especially adapted for velocipedes, the combination of a spur wheel carrying a toothed chain wheel or other equivalent appliance for the transmission of motion and capable of a movement at or about right angles to its axis of rotation with a spur gear and means whereby the latter may be locked to the said wheel when the two are concentric or geared together when they are eccentric.

2. In a multiple speed gear, the combination with a compound internal spur wheel carrying a toothed chain wheel, or other equivalent appliance for the transmission of motion, and capable of a movement at or about right angles to its axis of rotation; of a spur pinion capable of a lateral movement along and in the line of its axis of rotation, enabling it to gear with one or other of the rings of teeth in the compound internal spur wheel, as and for the purpose set forth.

3. In a multiple speed gear more especially adapted for velocipedes, the combination of a shaft and a spur pinion capable of a lateral movement thereon, with an internal spur wheel carrying a toothed chain wheel or other equivalent appliance for the transmission of motion, and a bearing carrying said spur wheel with means for moving the bearing at or about right angles to the said shaft to bring the spur wheel either concentric or eccentric to the pinion, whereby the spur pinion and wheel may be locked together when concentric and geared together when eccentric.

4. In a multiple speed gear specially adapted for velocipedes, the combination with the pedal-crank axle, of the spur pinion capable of a lateral movement on the said axle, of a compound internal spur wheel mounted in a vertically movable bearing and carrying a chain wheel, the arm carrying the bearing and the regulating spindle and its bracket, as and for the purpose set forth.

In testimony whereof I have signed my name to this specification in the presence of two subscribing witnesses.

FRANK BOWER.

Witnesses:
H. MITCHELL,
ALFRED NUTTING.